(12) United States Patent
Chen

(10) Patent No.: US 7,307,388 B2
(45) Date of Patent: Dec. 11, 2007

(54) BACKLIGHT MODULES AND LAMP MODULES IN FLAT PANEL DISPLAYS

(75) Inventor: Chung-Chuan Chen, Nantou (TW)

(73) Assignee: AU Optronics Corp., Hsinchu (TW)

(*) Notice: Subject to any disclaimer, the term of this patent is extended or adjusted under 35 U.S.C. 154(b) by 78 days.

(21) Appl. No.: 11/085,884

(22) Filed: Mar. 22, 2005

(65) Prior Publication Data

US 2006/0108946 A1    May 25, 2006

(30) Foreign Application Priority Data

Nov. 22, 2004   (TW) ............................. 93135858 A (51) Int. Cl.
*H05B 41/16* (2006.01)

(52) U.S. Cl. .................. 315/274; 315/279; 315/282; 315/324; 315/312

(58) Field of Classification Search ............. 315/324, 315/325, 323, 322, 185 S, 185 R, 274–289
See application file for complete search history.

(56) References Cited

U.S. PATENT DOCUMENTS

| | | | |
|---|---|---|---|
| 7,030,569 B2* | 4/2006 | Gray | 315/224 |
| 2004/0223102 A1* | 11/2004 | Kwon et al. | 349/115 |
| 2005/0093484 A1* | 5/2005 | Ball | 315/291 |
| 2005/0248287 A1* | 11/2005 | Chou et al. | 315/209 PZ |
| 2006/0061305 A1* | 3/2006 | Ahn et al. | 315/312 |
| 2006/0125424 A1* | 6/2006 | Gray | 315/312 |

* cited by examiner

*Primary Examiner*—Tuyet Vo
(74) *Attorney, Agent, or Firm*—Thomas, Kayden, Horstemeyer & Risley (57) ABSTRACT

A lamp module for use in a backlight module of a flat panel display comprises a first transformer, a second transformer, a plurality of first lamps and a plurality of second lamps. The first transformer provides an AC power of a first phase, and the second transformer provides an AC power of a second phase. One end of the first lamp couples to the first transformer and another end couples to a node. One ends of the second lamps couples to the second transformer and another end couples to the node.

14 Claims, 7 Drawing Sheets

BACKLIGHT MODULES AND LAMP MODULES IN FLAT PANEL DISPLAYS

BACKGROUND

The invention relates to backlight modules in flat panel displays, and more particularly, to the architecture of lamps and transformers in direct type backlight modules.

Figure 1A:
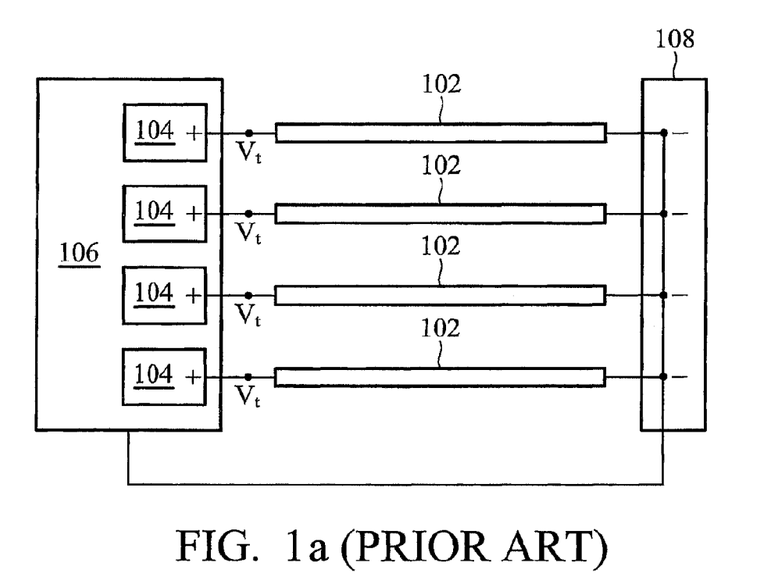
FIG. 1a shows a conventional lamp module.
Figure 1B:
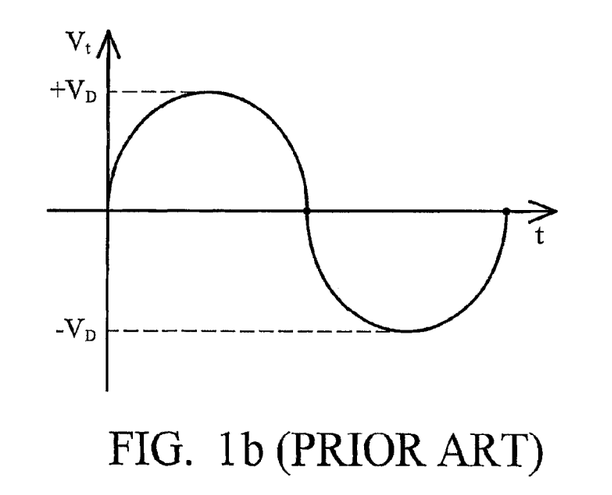

In direct type flat panel displays, lamps are directly placed at the bottom of the panel as the light source. FIG. 1a shows a conventional lamp module. The lamp module comprises an electric board 106, and a plurality of transformers 104 coupled to the electronic board 106 for alternating current (AC) power generation. The current flows through the lamps 102, the feedback circuit 108 and the electronic board 106 to form an electronic loop. FIG. 1b is a timing chart of an AC voltage, showing a sinusoidal wave having a frequency of 60 Hz. In this case, all lamps are soldered to a common node coupling to the electronic board 106 to form an electronic loop. The cost is significantly high.

Figure 2A:
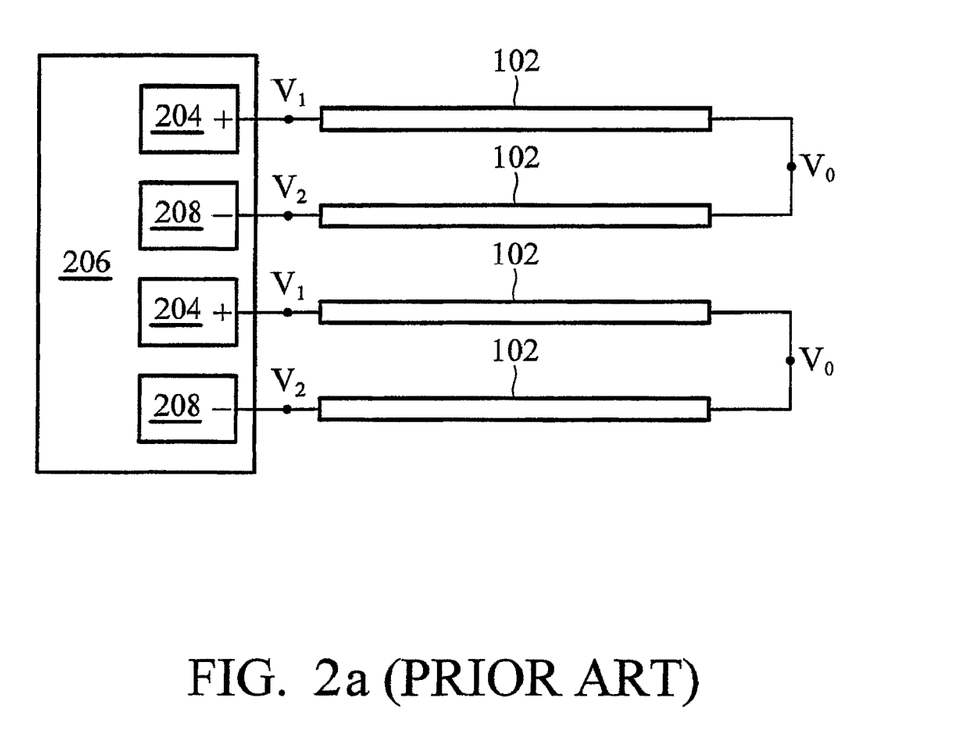
FIG. 2a shows a conventional lamp module.
Figure 2B:
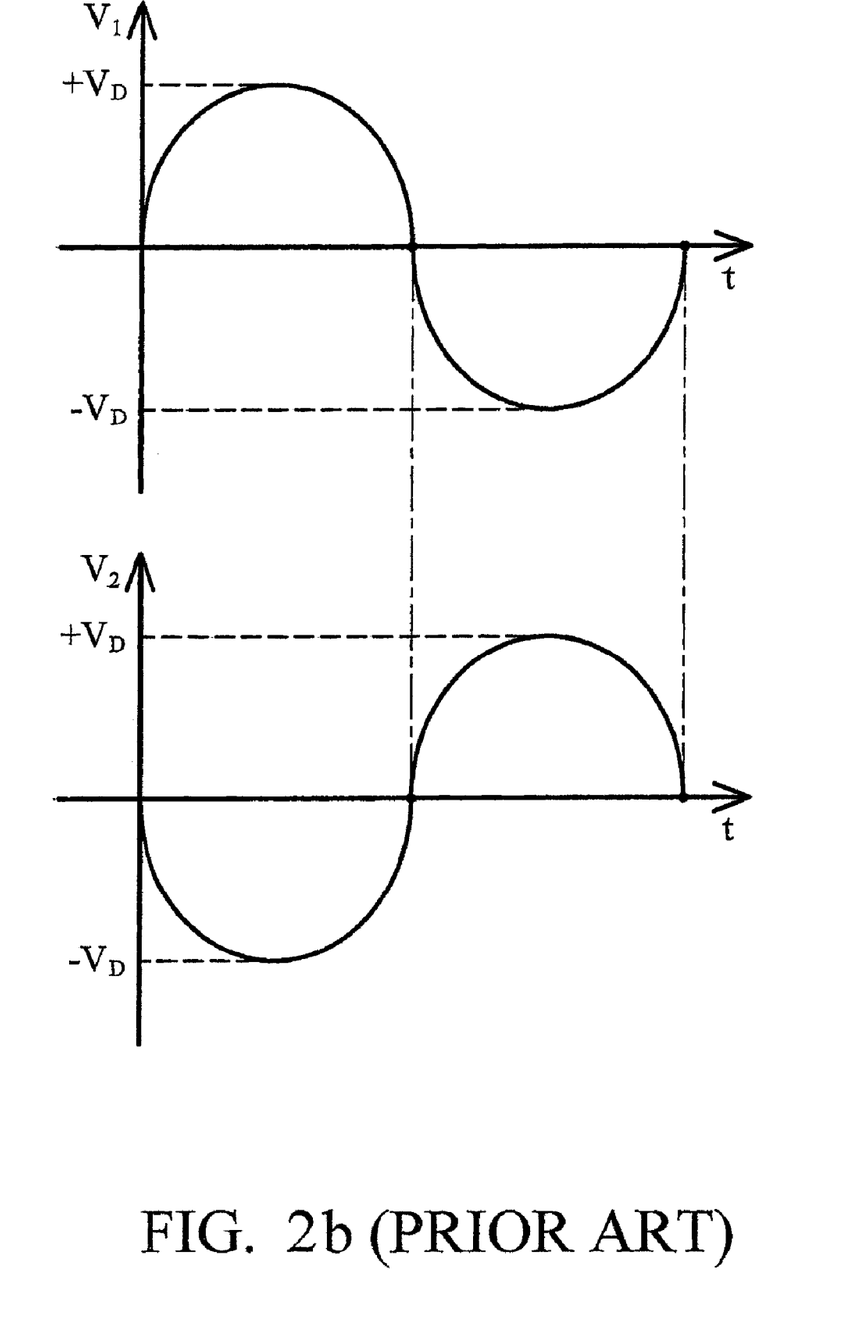

FIG. 2a shows an improved lamp module. A first phase transformer 204 and a second phase transformer 208 are coupled to an electronic board 206, and two lamps 102 are cascaded therebetween. The AC voltages on the node $V_1$ and $V_2$ shown in FIG. 2b, comprise phases differing by 180 degrees to each other while the amplitude and frequency are identical. The electronic loop formed in such way reduces common node cost, however, each lamp requires one corresponding first phase transformer 204 or second phase transformer 208 to drive, and further cost reduction is still desirable.

Figure 3:
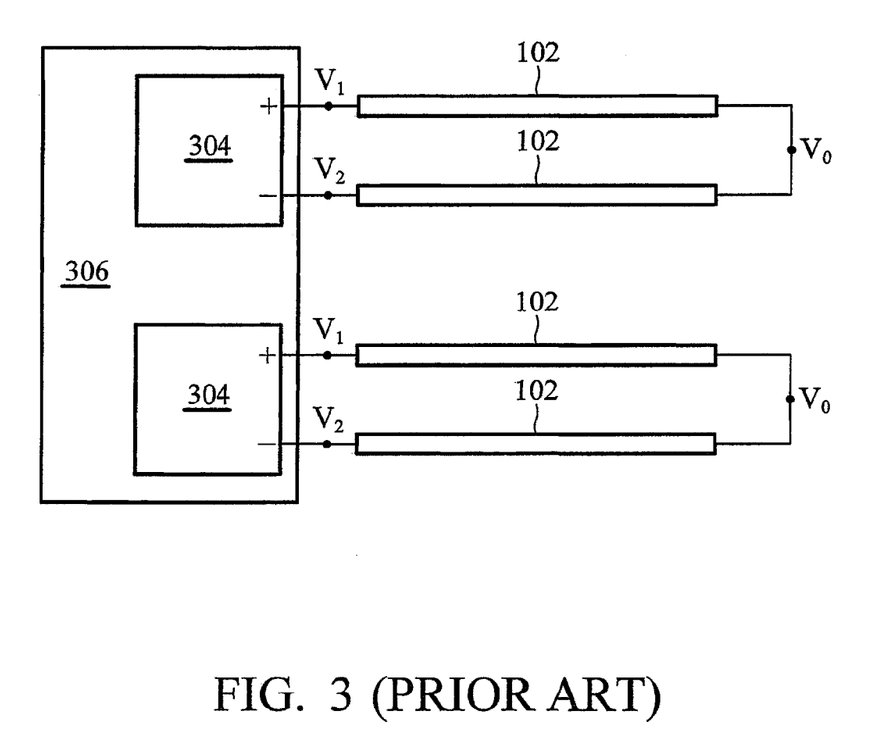
FIG. 3 shows a conventional lamp module.

FIG. 3 shows another improvement of the lamp module. A plurality of transformers 304 are coupled to the electronic board 306, each comprising node $V_1$ and $V_2$ applied by the AC voltages shown in FIG. 2b. Because each transformer 304 drives two lamps 102, the utilization rate is improved. In this case, the cost is reduced, however, the possibility of flashover is increased due to reduced space between positive and negative voltages. If the space therebetween is increased to avoid flashover, the size of transformers 304 grows exceedingly large, causing volume waste.

SUMMARY

An embodiment of the invention provides a lamp module for use in a backlight module of a flat panel display, comprising a first transformer, a second transformer, a plurality of first lamps, and a plurality of second lamps. The first transformer provides an AC voltage of a first phase. The second transformer provides an AC voltage of a second phase. The first ends of the first lamps couple to the first transformer and second ends of the first lamps couple to a node. The first ends of the second lamps couple to the second transformer and second ends of the second lamps couple to the node. The first phase and the second phase differ by 180 degrees. The first lamps are cold cathode fluorescent light tubes. The second lamps are cold cathode fluorescent light tubes.

Another embodiment of the invention provides a lamp module for use in a backlight module of a flat panel display, comprising a first transformer, a second transformer, a third transformer, a fourth transformer, a plurality of first lamps, a plurality of second lamps, a plurality of third lamps, and a plurality of fourth lamps. The first and fourth transformers provide AC voltages of a first phase. The second and third transformers provide AC voltages of a second phase. The first ends of the first lamps couple to the first transformer and second ends of the first lamps couple to a first node. The first ends of the second lamps couple to the second transformer and second ends of the second lamps couple to the first node. The first ends of the third lamps couple to the third transformer and second ends of the third lamps couple to a second node. The first ends of the fourth lamps couple to the fourth transformer and second ends of the fourth lamps couple to the second node.

A further embodiment of the invention provides a backlight module comprising the described lamp module, an optical film, and a reflector. The optical film is placed at the first side of the plurality of first and second lamps. The reflector is placed at the second side of the plurality of first and second lamps.

BRIEF DESCRIPTION OF THE DRAWINGS

The following detailed description, given by way of example and not intended to limit the invention solely to the embodiments described herein, will best be understood in conjunction with the accompanying drawings, in which:

FIG. 1b is a timing chart of $V_t$ according to FIG. 1a;

FIG. 2b is a timing chart of $V_1$ and $V_2$ according to FIG. 2a;

DETAILED DESCRIPTION OF THE INVENTION

Figure 4A:
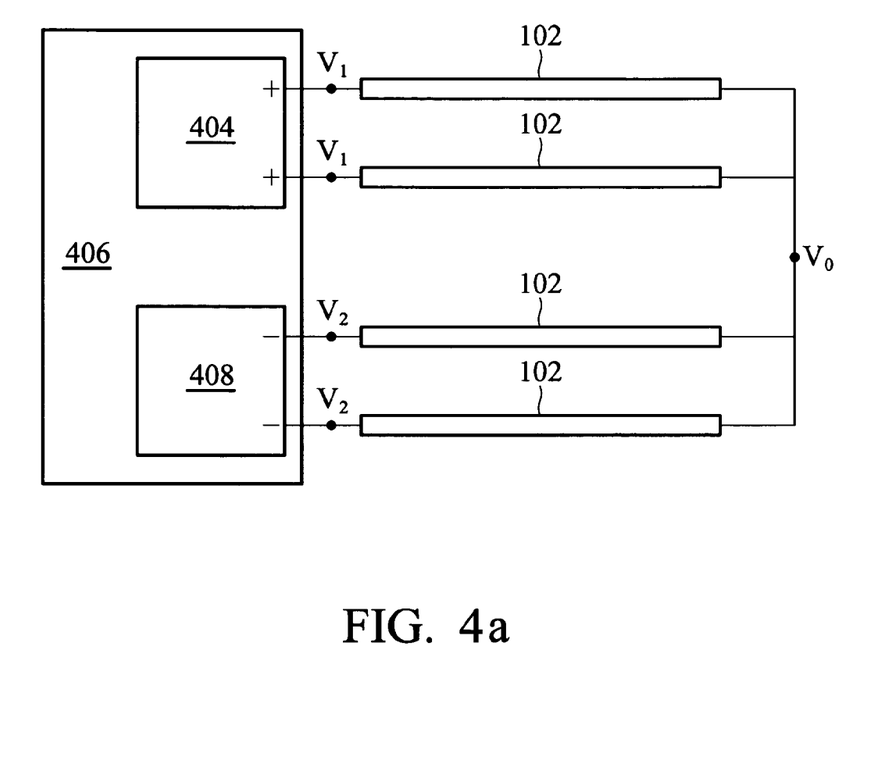
FIGS. 4a and 4b show an embodiment of a lamp module.

FIG. 4a shows an embodiment of a lamp module comprising an electronic board 406, and a first phase transformer 404 and a second phase transformer 408 coupled thereto. The first phase transformer 404 and the second phase transformer 408 receive power supplied from the electronic board 406, and generate AC power, such as AC voltages or AC currents with different phases respectively. Each of the first phase transformer 404 and second phase transformer 408 cascades with two lamps 102 respectively, and the other ends of the lamps 102 commonly couple to a node $V_0$, forming an electronic loop. An exemplified variation of AC voltages on node $V_1$ and $V_2$ are shown in the timing chart in FIG. 2b, where $V_D$ represents a peak of the AC voltage. In this way a current flows along the path between the first phase transformer 404 and second phase transformer 408, and drives the four cascaded lamps 102. As the phase difference between nodes $V_1$ and $V_2$ is 180 degrees, the nodes $V_1$ and $V_2$ are always at opposite polarities, therefore the symbol "+" on first phase transformer 404 and "−" on second phase transformer 408 represent phase difference therebetween.

Figure 4B:
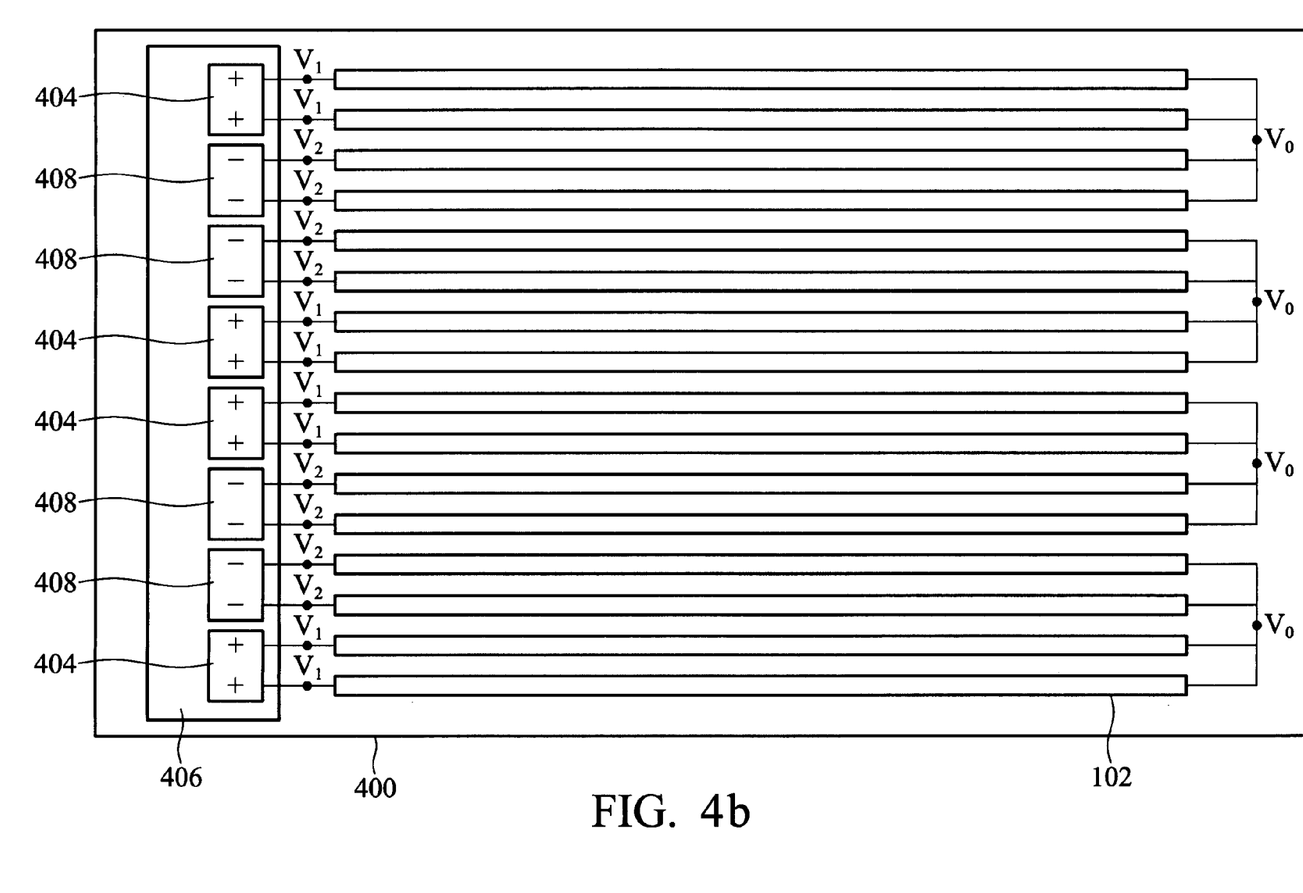

FIG. 4b shows another embodiment of a lamp module 400. The components are substantially identical to the embodiment in FIG. 4a, except that a plurality of the first phase transformers 404 and second phase transformers 408 are utilized. In this case, the arrangement of first phase transformers 404 and second phase transformers 408 is capable of efficiently reducing potential flashover. The number of lamps 102 driven by the first phase transformers 404 and second phase transformers 408 in this embodiment is four, however, it is not limited thereto. The timing chart of the AC voltages applied on the node $V_1$ and $V_2$ are identical to those shown on FIG. 2b, thus a current flowing along the path drive all the lamps 102 therebetween.

Figure 5:
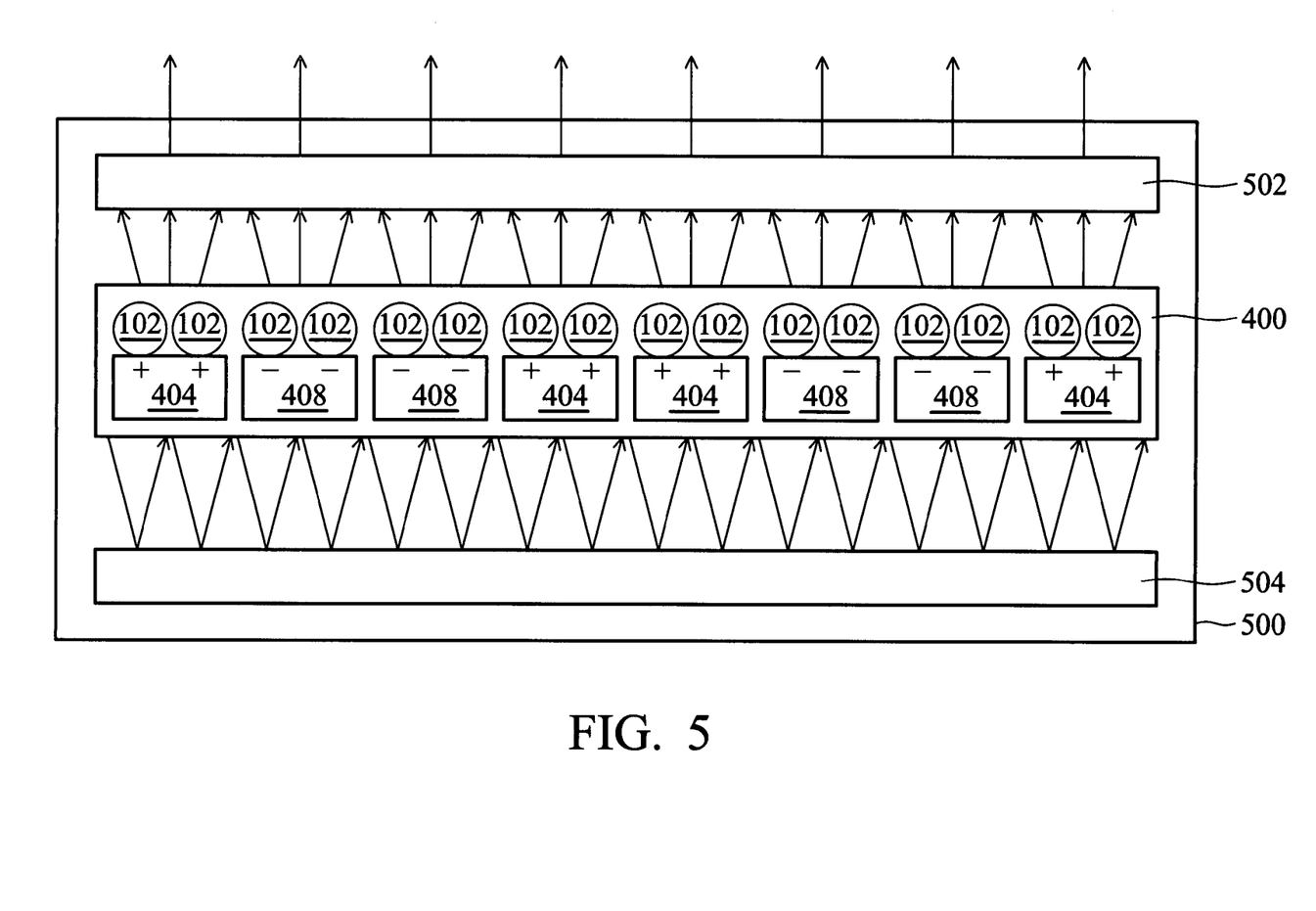
FIG. 5 shows an embodiment of a direct type backlight module.

FIG. 5 shows an embodiment of a direct type backlight module 500 comprising the described lamp module 400. Further, the backlight module 500 comprises a reflector 504 placed at the bottom of the lamp module 400 for reflecting light upwards, and a diffusion sheet 502 placed at the top of the lamp module 400, transforming the dot light generated by the lamp module 400 into parallel light through light diffusion effect. The diffusion sheet 502 and reflector 504 are known in the art, therefore a detailed description thereof is omitted herein. In the lamp module 400, the first phase transformers 404 (shown as ⊞) and the second phase transformers 408 (shown as ⊟) are arranged in a formation:

The number of transformers in FIG. 5 is eight, however it is not limited to this. For a transformer, the two adjacent transformers are chosen to be of opposite polarity, thus reducing the chance that a positive voltage is adjacent to a negative voltage, and the possibility of flashover can be reduced.

In summary, the embodiment eliminates the need for coupling the feedback circuit 108 and electronic board 106, thus the cost is reduced. Compared to the conventional lamp module in FIG. 2a, each transformer in the invention is capable of cascading more than one lamps 102, thus the utilization rate is increased. Additionally, the possibility of flashover is effectively avoided by this arrangement.

While the invention has been described by way of example and in terms of the preferred embodiment, it is to be understood that the invention is not limited thereto. To the contrary, it is intended to cover various modifications and similar arrangements (as would be apparent to those skilled in the art) Therefore, the scope of the appended claims should be accorded the broadest interpretation so as to encompass all such modifications and similar arrangements.

What is claimed is:

1. A lamp module, for use in a backlight module of a flat panel display, comprising:
   a first transformer for providing an AC power of a first phase;
   a second transformer for providing an AC power of a second phase;
   a plurality of first lamps operating in the first phase, wherein first ends of the first lamps couple to the first transformer, and the second ends of the first lamps couple to a floating node; and
   a plurality of second lamps operating in the second phase, wherein first ends of the second lamps couple to the second transformer and second ends of the second lamps couple to the floating node; wherein the first phase and the second phase differ by 180 degrees.

2. The lamp module as claimed in claim 1, wherein the first lamps are cold cathode fluorescent light tubes.

3. The lamp module as claimed in claim 1, wherein the second lamps are cold cathode fluorescent light tubes.

4. A lamp module, for use in a backlight module of a flat panel display, comprising:
   a first transformer for providing an AC power of a first phase;
   a second transformer for providing an AC power of a second phase;
   a third transformer for providing an AC power of the second phase;
   a fourth transformer for providing an AC power of the first phase;
   a plurality of first lamps, wherein first ends of the first lamps couple to the first transformer and second ends of the first lamps couple to a first node;
   a plurality of second lamps, wherein first ends of the second lamps couple to the second transformer and second ends of the second lamps couple to the first node;
   a plurality of third lamps, wherein first ends of the third lamps couple to the third transformer and second ends of the third lamps couple to a second node; and
   a plurality of fourth lamps, wherein first ends of the fourth lamps couple to the fourth transformer and second ends of the fourth lamps couple to the second node; wherein the first phase and the second phase differ by 180 degrees.

5. The lamp module as claimed in claim 4, wherein the first lamps are cold cathode fluorescent light tubes.

6. The lamp module as claimed in claim 4, wherein the second lamps are cold cathode fluorescent light tubes.

7. A backlight module, for use in a flat panel display, comprising:
   a first transformer for providing an AC power of a first phase;
   a second transformer for providing an AC power of a second phase;
   a plurality of first lamps operating in the first phase, comprising first ends coupling to the first transformer and second ends coupled to a floating node;
   a plurality of second lamps operating in the second phase, comprising first ends coupling to the second transformer and second ends connected to the floating node;
   an optical film, placed at the first side of the plurality of first and second lamps; and
   a reflector, placed at the second side of the plurality of first and second lamps; wherein the first phase and the second phase differ by 180 degrees.

8. The backlight module as claimed in claim 7, wherein the optical film is a diffusion sheet.

9. The backlight module as claimed in claim 7, wherein the first lamps are cold cathode fluorescent light tubes.

10. The backlight module as claimed in claim 7, wherein the second lamps are cold cathode fluorescent light tubes.

11. A backlight module, for use in a flat panel display, comprising:
   a first transformer for providing an AC power of a first phase;
   a second transformer for providing an AC power of a second phase;
   a third transformer for providing the AC power of the second phase;
   a fourth transformer for providing the AC power of the first phase;
   a plurality of first lamps, comprising first ends coupling to the first transformer and second ends coupling to a first node;
   a plurality of second lamps, comprising first ends coupling to the second transformer and second ends coupling to the first node;
   a plurality of third lamps, comprising first ends coupling to the third transformer and second ends coupling to a second node;
   a plurality of fourth lamps, comprising first ends coupling to the fourth transformer and second ends coupling to the second node;

an optical film, placed at the first side of the plurality of first and second lamps; and a reflector, placed at the second side of the plurality of first and second lamps; wherein the first phase and the second phase differ by 180 degrees.

12. The backlight module as claimed in claim 11, wherein the optical film is a diffusion sheet.

13. The backlight module as claimed in claim 11, wherein the first lamps are cold cathode fluorescent light tubes.

14. The backlight module as claimed in claim 11, wherein the second lamps are cold cathode fluorescent light tubes.

* * * * *